US007322528B2

(12) United States Patent
Lee et al.

(10) Patent No.: US 7,322,528 B2
(45) Date of Patent: Jan. 29, 2008

(54) SHUTTER APPARATUS OF CASH TRANSACTION MACHINE

(75) Inventors: Won Joon Lee, Seodaemun-gu (KR); Dong Sik Lee, Dobong-gu (KR); Joong Hyuk Han, Dobong-gu (KR); Jin Yong Hwang, Bucheon-si (KR)

(73) Assignee: Nautilus Hyosung Inc. (KR)

(*) Notice: Subject to any disclaimer, the term of this patent is extended or adjusted under 35 U.S.C. 154(b) by 0 days.

(21) Appl. No.: 11/275,654

(22) Filed: Jan. 20, 2006

(65) Prior Publication Data

US 2006/0243789 A1 Nov. 2, 2006

(30) Foreign Application Priority Data

Apr. 27, 2005 (KR) ...................... 10-2005-0034936

(51) Int. Cl.
*G06K 13/06* (2006.01)
*G06K 13/24* (2006.01)

(52) U.S. Cl. ....................................... 235/483; 235/379

(58) Field of Classification Search ................ 235/379, 235/380, 476, 479, 483, 486
See application file for complete search history.

(56) References Cited

U.S. PATENT DOCUMENTS 4,438,704 A * 3/1984 Hutcheon .................... 109/44
5,172,643 A 12/1992 Koshida ...................... 109/10
5,721,420 A * 2/1998 May ........................... 235/379
2005/0091675 A1* 4/2005 Maruyama .................. 720/616

FOREIGN PATENT DOCUMENTS

EP 1 044 438 10/2000

OTHER PUBLICATIONS

European Search Report, (Application No. 06250565.6-2211), mailed Aug. 21, 2006, 6 pages.

* cited by examiner

*Primary Examiner*—Michael G. Lee
*Assistant Examiner*—Kumiko C. Koyama
(74) *Attorney, Agent, or Firm*—Fish & Richardson P.C.

(57) ABSTRACT

A shutter apparatus of a cash transaction machine, including: a drive unit; a cam rotating body engaged with the drive unit and including a guide rail eccentric to the rotation center thereof; and a shutter including a guide projection moving along the guide rail, which shuffles a straight path in response to the rotation of the cam rotating body. Since the shutter can be moved by using the rotation of the cam rotating body, the structure of the shutter apparatus can be simply maintained. Also, the rotation center of the cam rotating body and the guide projection are located on one straight line, thereby forming a structural lock without an additional locking unit.

10 Claims, 9 Drawing Sheets

SHUTTER APPARATUS OF CASH TRANSACTION MACHINE

CROSS-REFERENCE TO RELATED APPLICATIONS

This application claims the benefit of Korean Patent Application No. 10-2005-34936, filed on Apr. 27, 2005, in the Korean Intellectual Property Office, the disclosure of which is incorporated herein in its entity by reference.

BACKGROUND OF THE INVENTION

1. Field of the Invention

The present invention relates to a cash transaction machine, and more particularly, to a shutter apparatus that can operate a shutter for safely protecting a withdrawal unit for discharging a paper media such as notes, checks, vouchers, and tickets from the cash transaction machine.

2. Description of the Related Art

A cash transaction machine is an automated machine that can support basic banking services such as deposit or withdrawal, without a staff of a bank or regardless of location or time in association with banking services. The cash transaction machine may be divided into a cash dispenser and an automated teller machine. Currently, the cash transaction is used for not only cash transaction but also check transaction, writing account balances in a bankbook, paying by giro, and ticketing.

Now, the use of the cash transaction machine is gradually increased in banks or other financial institutions. Since it becomes conveniently to use the cash transaction machine, customers gradually and frequently use the cash transaction machine. The more increased the number of using the cash transaction machine, the more increased the amount of monetary transaction. According to the increase of the amount of money transacted via the cash transaction machine, a plurality of sheets of cash are deposited or withdrawn. According to the using the plurality of sheets of cash, an unexpected matter may frequently occur in the cash transaction machine due to interferences in the movement or location occurring between cash.

FIG. 1 is a perspective view of a conventional cash transaction machine.

Referring to FIG. 1, the cash transaction machine is an equipment for depositing/withdrawing cash or checks, which includes several modules distinguished by a function in a housing, such as a magnetic card reading module, a bankbook arrangement module, a user interface module, a note depositing/withdrawing module.

In the cash transaction machine, the magnetic card reading module is exposed outside via a card input unit 10, and the user interface module is exposed outside via a display screen 20 or a key input unit 25.

Also, the note outputting module is exposed outside via a cash discharge unit 30. The cash discharge unit 30 shown in FIG. 1 is according to a direct discharge type, in which the amount of cash previously requested is prepared in the note withdrawing module before the cash are provided at the cash discharge unit 30 by a stack.

The cash discharge unit 30 is generally protected by a shutter 32. The shutter 32 moves to open the cash discharge unit 30 in case that cash is provided, and the shutter 32 returns to close the cash discharge unit 30. The shutter 32 is closed, thereby preventing invaders and protecting the cash transaction machine from incursion via the cash discharge unit 30. Accordingly, the conventional shutter 32 may include an additional locking device. Since the locking device is generally operated regardless of a unit driving the shutter 32, the operation of the shutter 32 and the operation of the locking device are controlled independently. Also, since the locking device can not strongly support the shutter 32, the locking device may not normally perform the function thereof.

SUMMARY OF THE INVENTION

The present invention provides a shutter apparatus that can simply operate a shutter of a cash transaction machine.

The present invention also provides a shutter apparatus having a structure to safely lock a shutter without using an additional locking device.

The present invention also provides a shutter apparatus whose operation mechanism can be simple by maintaining a simple structure thereof.

According to an aspect of the present invention, there is provided a shutter apparatus of a cash transaction machine includes a drive unit, a cam rotating body, and a shutter. The cam rotating body is engaged with the drive unit and rotates. The shutter shuttles along a certain straight path by the rotation of the cam rotating body. In order to engage the cam rotating body with the shutter, a guide rail eccentric to the rotation center of the cam rotating body is provided in the cam rotating body. A guide projection moves along the guide rail and the shutter may shuttle the certain path. Generally, the shutter may vertically move to open/close a withdrawal unit. In addition, the shutter may shuttle horizontally or in other directions to open/close the withdrawal unit.

The guide rail may be formed on the surface of the cam rotating body, in a closed shape such as a circle or an oval or may be formed in an open shape such as a curved line.

Also, a straight line connecting the rotation center of the cam rotating body and the guide projection is parallel to a moving direction of the shutter in a state in which the shutter is closed, thereby structurally keeping the shutter in a locking state. The rotation center of the cam rotating body and the guide projection are located on one straight line, thereby supporting the shutter without a partiality by using the structure of the cam rotating body and strongly keeping the locking state without an additional locking device. Also, in case that the shutter is closed, a settling groove is formed on the guide rail is in contact with the guide projection, thereby easily keeping the shutter in the locking state.

One or at least two cam rotating bodies may be used. In case that the cam rotating body is one, a structural locking by using the cam rotating body may be embodied. In case that the two cam rotating bodies are used, since the shutter is supported or pressed from both sides by the cam rotating bodies, thereby keeping the horizontality and relatively reducing the dependence with respect to a shutter guide, less than a conventional shutter apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
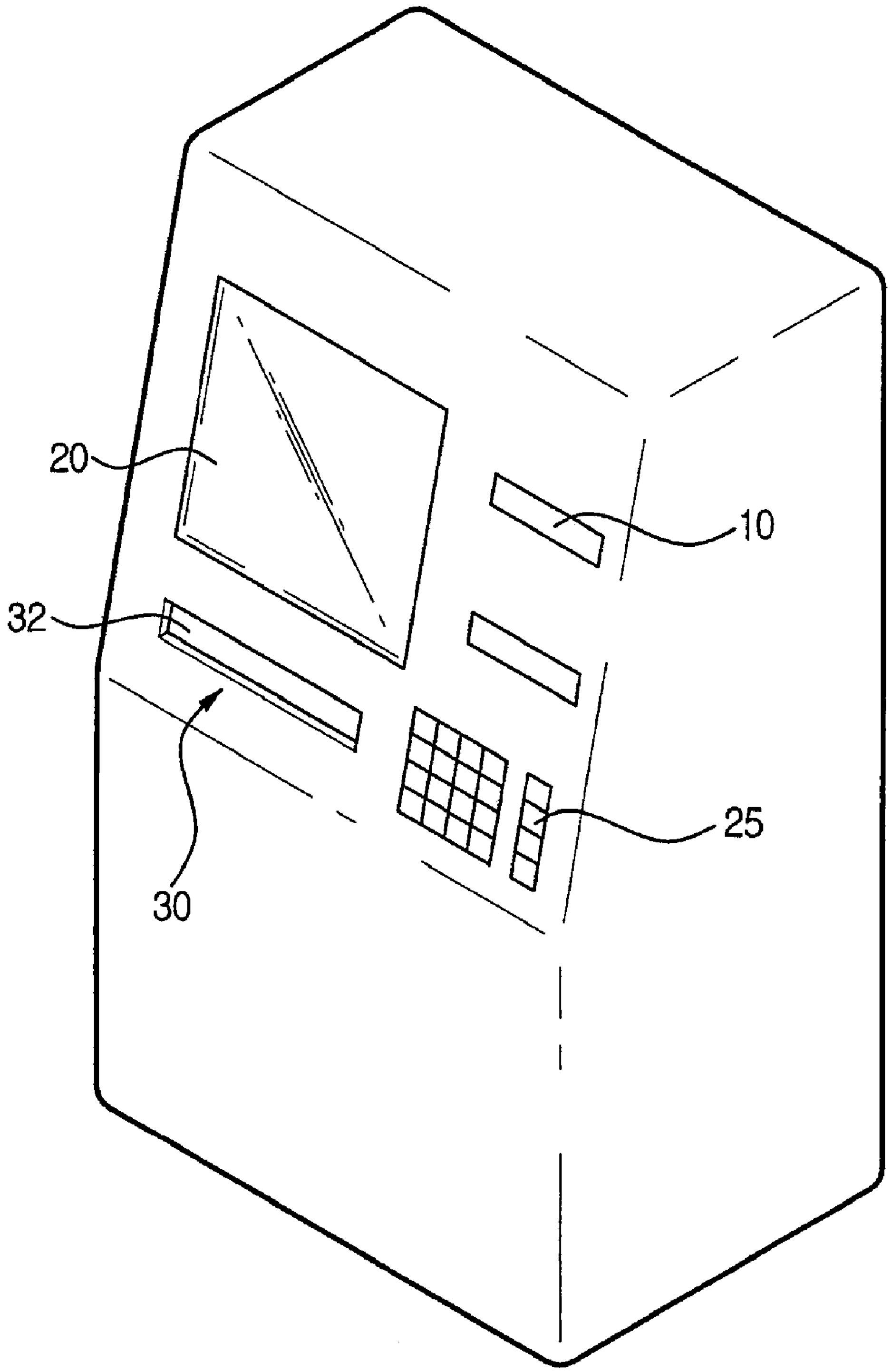
FIG. 1 (PRIOR ART)
FIG. 1 is a perspective view of a conventional a cash transaction machine.

The present invention will now be described more fully with reference to the accompanying drawings, in which exemplary embodiments of the invention are shown. The invention may, however, be embodied in many different forms and should not be construed as being limited to the embodiments set forth herein. For reference, in the following description, elements which are identically dealt in configuration and function thereof are almost identical may be designated by an identical reference numeral.

Figure 2:
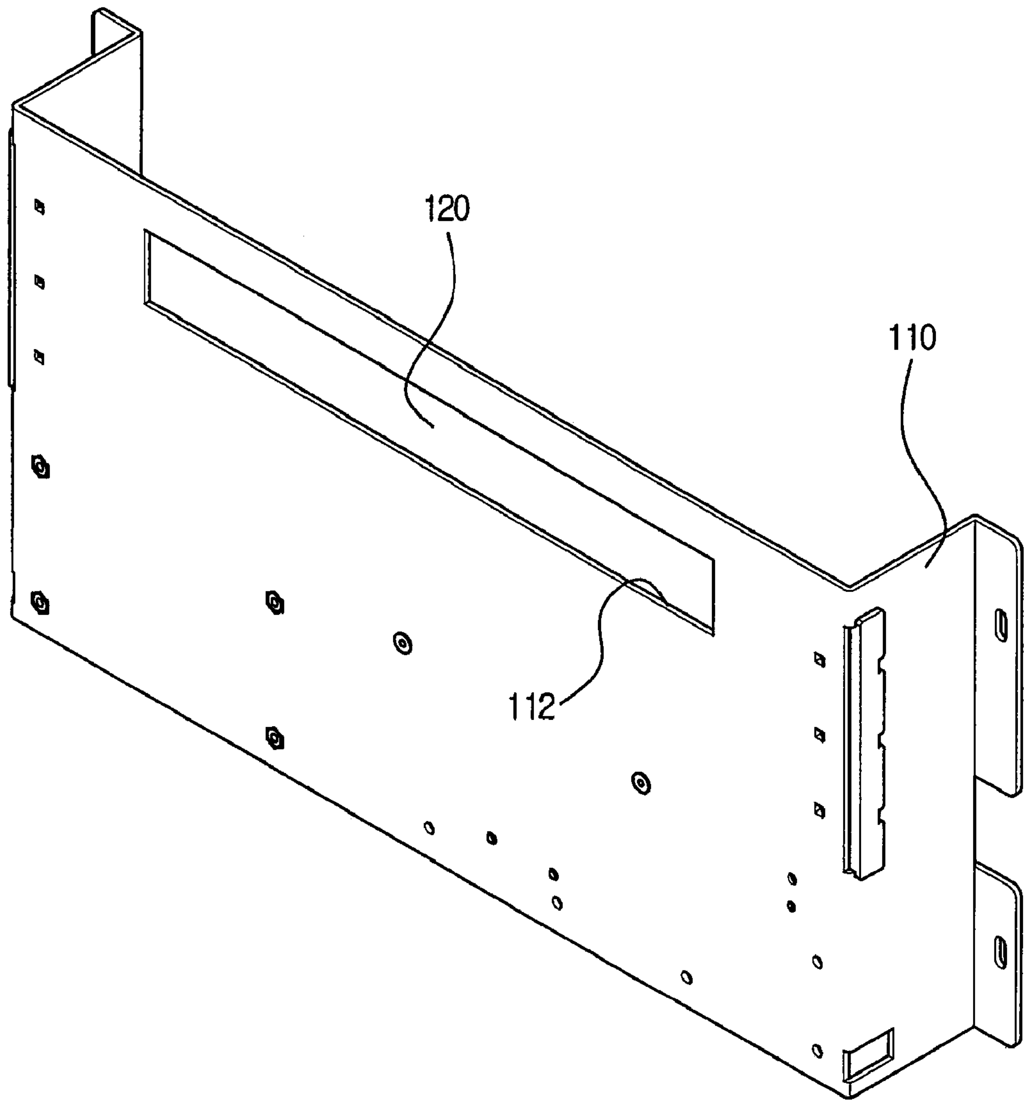
FIG. 2 is a perspective view illustrating a shutter apparatus according to an embodiment of the present invention.
Figure 3:
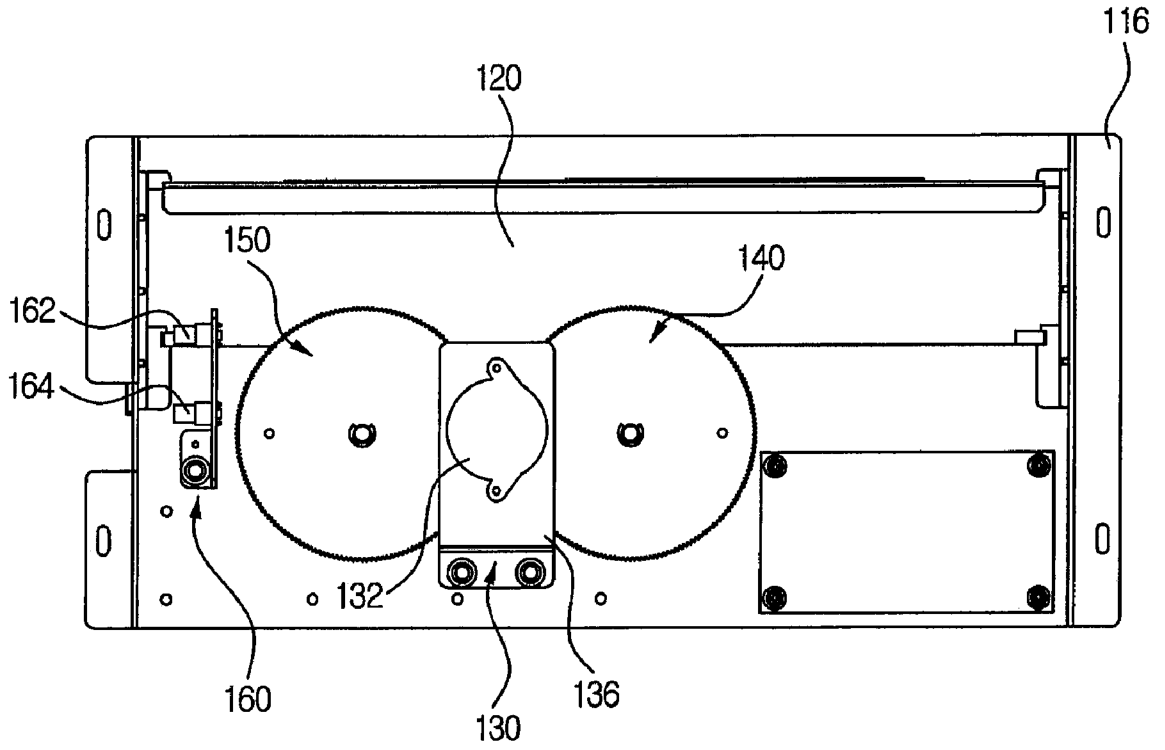
FIG. 3 is a rear side view of the shutter apparatus of FIG. 2.

FIG. 2 is a perspective view illustrating a shutter apparatus according to an embodiment of the present invention, and FIG. 3 is a rear side view of the shutter apparatus of FIG. 2.

Referring to FIGS. 2 and 3, a shutter apparatus 100 includes a main bracket 110, a shutter 120, a drive unit 130, a first cam rotating body 140, a second cam rotating body 150, and a sensor unit 160. The main bracket 110 is installed adjacent to a withdrawal unit of a withdrawal apparatus (not shown), and cash withdrawn from the withdrawal apparatus are exposed outside via an outlet 112 formed in the main bracket 110. The drive unit 130 may be installed inside the main bracket 110 by a motor bracket 136, and a drive motor 132 is installed at the motor bracket 136 to generate the motive power for moving the shutter 120. The first cam rotating body 140 and the second cam rotating body 150 may be rotated due to the rotation of the drive 132, and the shutter 120 may be vertically moved by the rotation of the first and second cam rotating bodies 140 and 150. The shutter 120 is moved by the rotation of the first and second cam rotating bodies 140 and 150, thereby opening/closing the outlet 112. In this case, the sensor unit 160 is installed adjacent to the shutter 120, and the open/close of the shutter 120 may be sensed by the sensor unit 160.

As illustrated, the first cam rotating body 140 and the second cam rotating body 150 are disposed both sides of one drive motor 132, and the first cam rotating body 140 and the second cam rotating body 150 symmetrically rotate. Accordingly, the shutter 120 may be horizontally ascended and descended by the first cam rotating body 140 and the second cam rotating body 150 and may be vertically moved along a determined path without installing an additional shutter guide 124.

Figure 4:
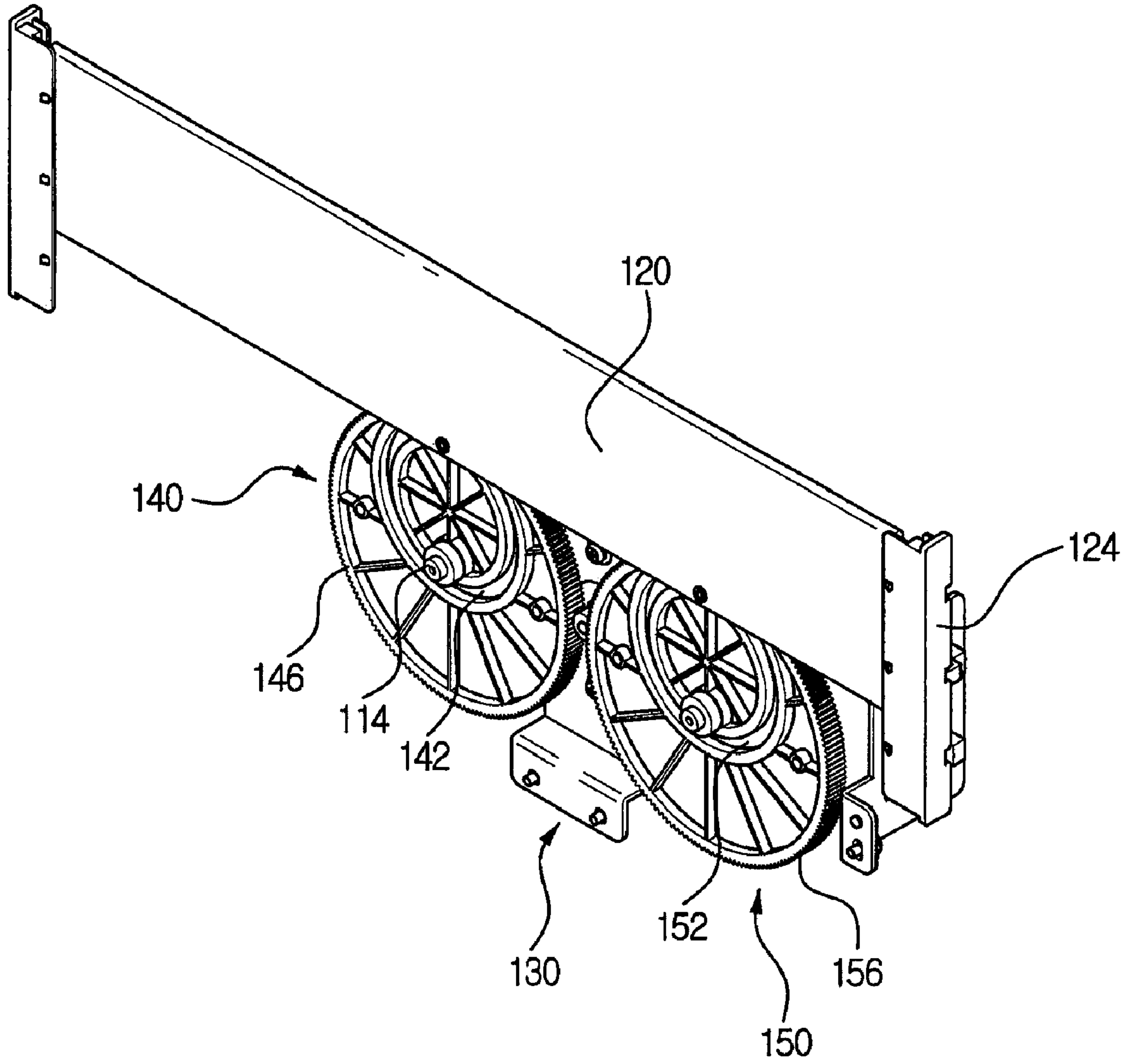
FIG. 4 is a perspective view illustrating a shutter apparatus of FIG. 2.
Figure 5:
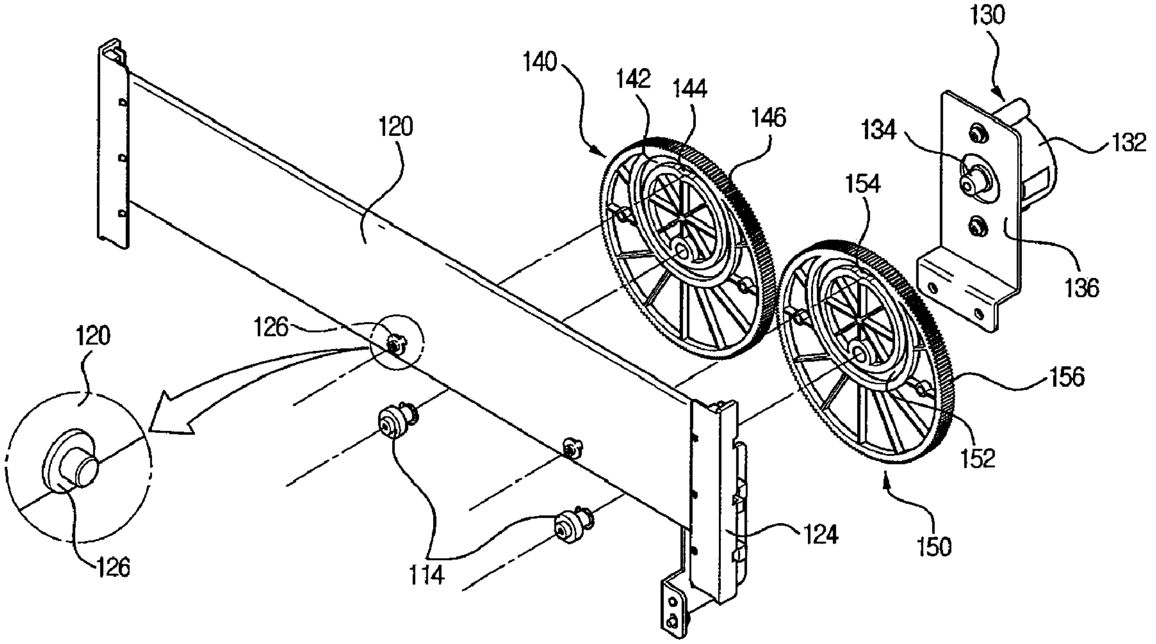
FIG. 5 is an exploded perspective view illustrating of the shutter apparatus of FIG. 4.

FIG. 4 is a perspective view illustrating a shutter apparatus according to an embodiment of the present invention, and FIG. 5 is an exploded perspective view illustrating the shutter apparatus of FIG. 4.

Referring to FIGS. 4 and 5, the first cam rotating body 140 and the second cam rotating body 150 are installed at both sides of the drive unit 130 to be capable of rotating and installed to be engaged with the shutter 120 to vertically ascend/descend.

Concretely, the drive unit 130 includes the drive motor 132, gear teeth 134, and the motor bracket 136. The motor bracket 136 is fixed to the main bracket 110, and the drive motor 132 is installed at the motor bracket 136. The drive motor 132 may receive electric power from a control unit (not shown) of the cash transaction machine to be operated and may rotate in only one direction or two directions. The gear teeth 134 are installed at an end of the shaft of the drive motor 132. The gear teeth 134 are geared with the first and second cam rotating bodies 140 and 150, thereby transferring the rotation of the drive motor 132 to the first and second cam rotating bodies 140 and 150.

As described above, the first and second cam rotating bodies 140 and 150 are installed at the both sides of the gear teeth 134 of the drive motor 132. The first and second cam rotating bodies 140 and 150 are also installed at the main bracket 110 by a shaft component 114 and may rotate on the shaft component 114.

The first cam rotating body 140 includes a first guide rail 142 formed on the front thereof, and a first gear unit 146 is formed on an outer circumference surface of the first cam rotating body 140, thereby receiving the rotation power from the gear teeth 134. The first guide rail 142 is formed in a round groove shape and forms an eccentric structure with the first cam rotating body 140 instead of a concentric structure. Also, the second cam rotating body 150 also includes a second guide rail 152 formed at the front thereof and a second gear unit 156 formed on an outer circumference surface thereof. The second cam rotating body 150 may receive the rotation power from the gear teeth 134 to be rotated. As the first guide rail 142, the second guide rail 152 is also formed on the second cam rotating body 150 in a round groove shape having the same size, is symmetrical to the first guide rail 142, and forms the eccentric structure with the first cam rotating body 140 instead of the concentric structure.

The guide projection 126 is installed inward at the lower portion of the shutter 120. The guide projection 126 is separated from each other as the width between the shaft components 114 and may be moved along a certain path on a straight line connecting the top and bottom of the shaft component 114. The first and second guide rails 142 and 152 rotate in the same direction by the rotation of the first and second cam rotating bodies 140 and 150. The guide projections 126 move together by the rotation of the first and second guide rails 142 and 152, thereby vertically moving the shutter 120. In this case, the first and second cam rotating bodies 140 and 150 can rotate in both ways in the range of an angle of approximately 180 degrees or may continuously convert a phase by approximately 180 degrees in one direction.

The shutter guide 124 is installed at both sides of the shutter 120. The shutter guide 124 holds a part of the both side end portion, thereby guiding the shutter 120. Since the first and second cam rotating bodies 140 and 150 are formed in the same shape with each other and symmetrical with each other, the guide projection 126 may maintain the same height and the shutter 120 vertically moves while maintaining the horizontality. Namely, the dependence with respect to the shutter guide 124 is lower than the conventional shutter apparatus 100, and the shutter 120 regularly moves along the determined path.

Figure 6:
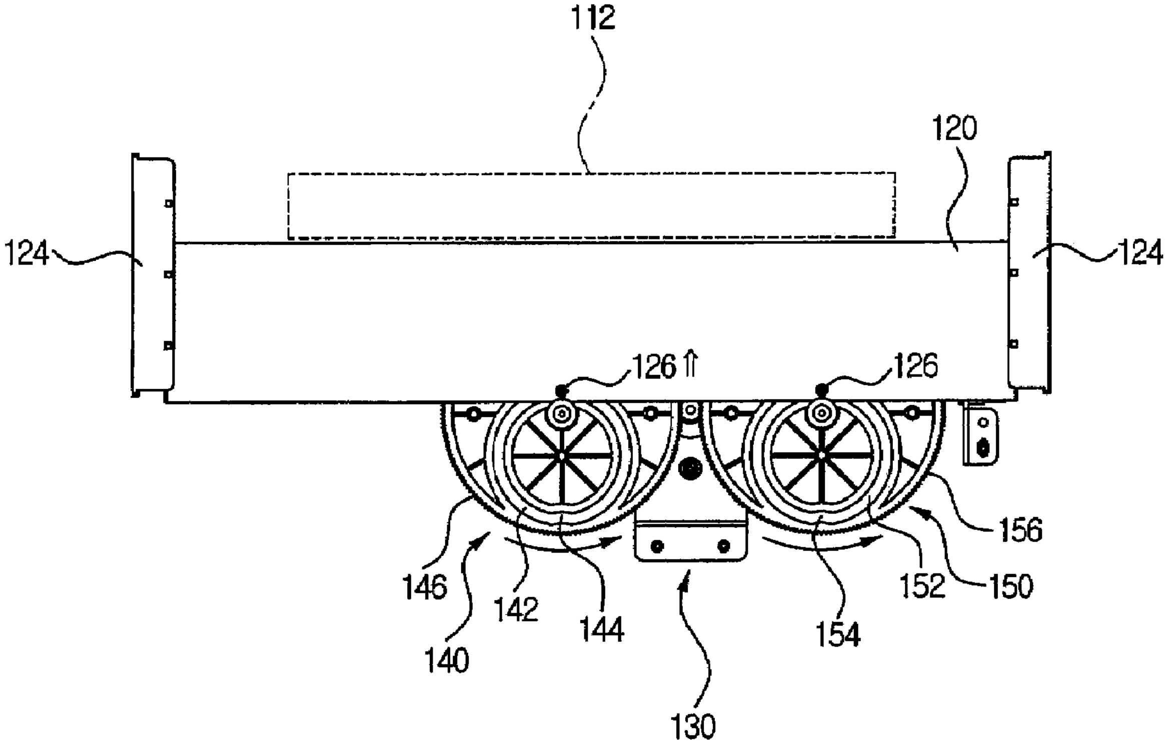
FIG. 6 is a front view illustrating an open state of the shutter apparatus of FIG. 4.
Figure 7:
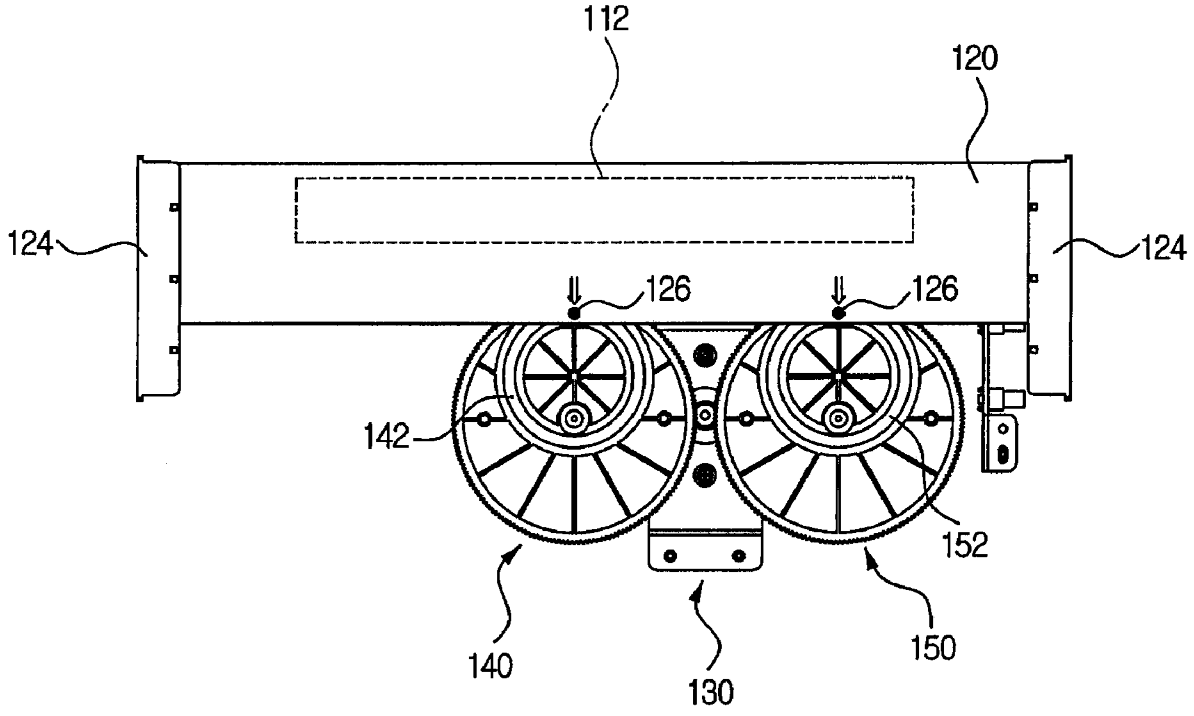
FIG. 7 is a front view illustrating an exclusion state of the shutter apparatus of FIG. 4.

FIG. 6 is a front view illustrating an open state of the shutter apparatus of FIG. 4, and FIG. 7 is a front view illustrating a close state of the shutter apparatus of FIG. 4.

Referring to FIG. 6, settling grooves 144 and 154 of the first and second guide rails 142 and 152 are located at the bottom end portion, and the guide projection 126 is located at a position most adjacent to the rotation center in the first and second guide rails 142 and 152. Accordingly, the shutter 120 is located at the bottom and the outlet 112 shown in a dotted line is in an open state.

In case that drive motor 132 rotates on the basis of the drawing in a clockwise direction, the first and second cam rotating bodies 140 and 150 rotate in a counterclockwise direction and the guide projection 126 is supported by the guide rails 142 and 152 to ascend. In this case, the guide projection 126 at the both sides of the shutter 120 is horizontally supported by the first and second guide rails 142 and 152 and vertically ascends while guided by the shutter guide 124.

Referring to FIG. 7, when the first and second cam rotating bodies 140 and 150 rotate by 180 degrees, the guide projection 126 is supported by the settling grooves 144 and 154 and the shutter 120 is located at the top. The outlet 112 is closed by the shutter 120 and is located on a straight line connecting the guide projection 126 with the shaft component 114. Since the guide projection 126 is supported by the first and second cam rotating bodies 140 and 150, the shutter 120 is not descended till one of the first and second cam rotating bodies 140 and 150 is broken. Of course, when the drive motor 132 operates, the shutter 120 is descended but cannot be descended by compulsion by external force.

Though the shutter apparatus 100 according to the present embodiment does not use an additional locking device, the first and second cam rotating bodies 140 and 150 structurally support the shutter 120 in the close state, thereby providing protection more than a locking device. Also, the shutter 100 may be provided as the simple structure including the drive unit 130, the first cam rotating body 140, the second cam rotating body 150, and the shutter 120, thereby obtaining effects of simple operation mechanism and sufficient locking.

As illustrated, the first and second cam rotating bodies 140 and 150 directly contact with the gear teeth 134 and may rotate in the same direction by the rotation of the gear teeth 134. However, according to another embodiment of the present invention, a driven gear teeth is additionally installed adjacent to a gear teeth, and the gear teeth and the driven gear teeth may be geared with first and second cam rotating bodies, respectively. In this case, the first and second cam rotating bodies may rotate in an opposite direction to each other.

Figure 8:
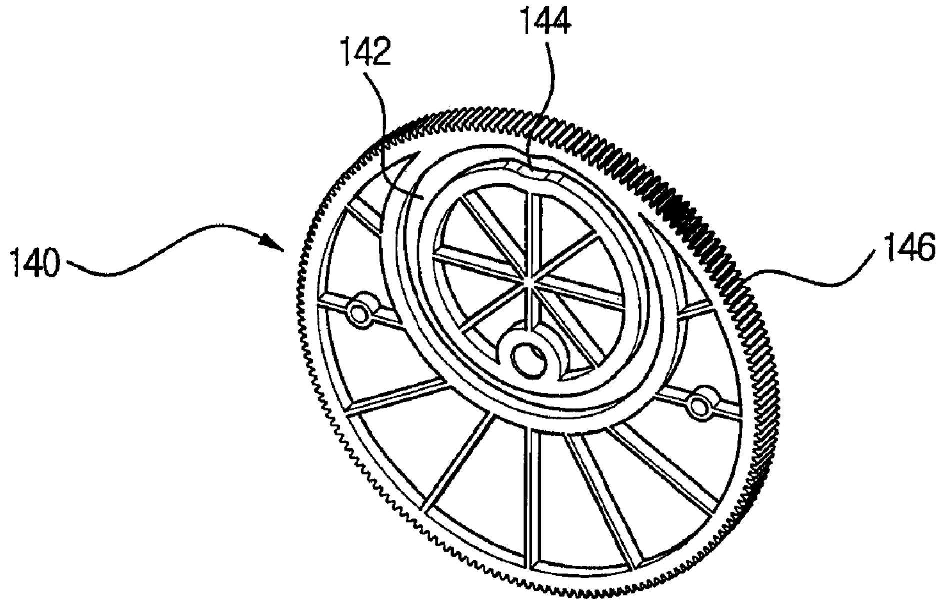
FIG. 8 is a perspective view illustrating a first cam rotating body in a shutter apparatus according to an embodiment of the present invention.
Figure 9:
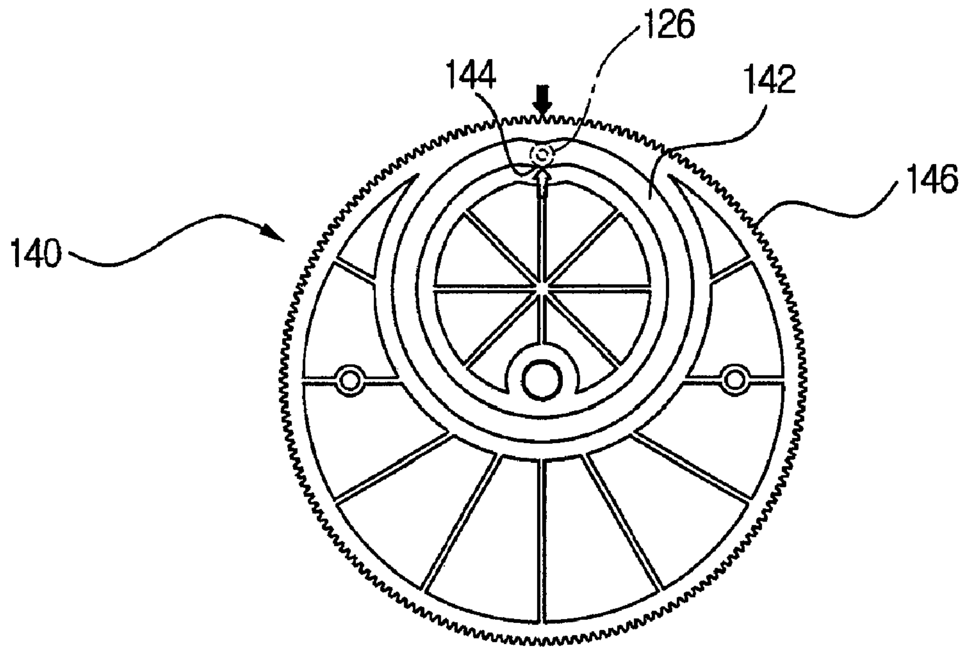
FIG. 9 is a front view illustrating the first cam rotating body of FIG. 8.

FIG. 8 is a perspective view illustrating the first cam rotating body in the shutter apparatus according to an embodiment of the present invention, and FIG. 9 is a front view illustrating the first cam rotating body of FIG. 8. For reference, the description on the first cam rotating body 140 may be identically applied to the second cam rotating body 150.

Referring to FIGS. 8 and 9, the first cam rotating body 140 is formed in an approximate circular plate shape, and the first guide rail 142 is formed in a round groove shape on the front surface of the first cam rotating body 140. The first guide rail 142 is eccentric to the first cam rotating body 140, and the settling groove 144 is formed in a position of the first guide rail 142, which is farthest from the first cam rotating body 140. The settling groove 144 is formed to be toward the rotation center of the first cam rotating body 140, and the guide projection 126 may be vertically supported by the settling groove 144. The guide projection 126 may be stably supported by the settling groove 144 in a state in which the shutter 120 is closed. Though there is a little error, the guide projection 126 and the rotation center are automatically controlled to be located on a straight line by interaction between the guide projection 126 and the settling groove 144. Also, the settling groove 144 prevents the guide projection 126 from being easily separated from a determined point by external force, thereby providing a stable locking function.

As illustrated in FIG. 9, in case that the guide projection 126 is located at the settling groove 144, namely, the shutter 120 is closed, and the guide projection 126 is located on a straight line vertically connecting the rotation center of the first cam rotating body 140. If the shutter 120 is pressed downward by external force, the first cam rotating body 140 may support the guide projection 126 and a strong locking state may be kept as long as the first cam rotating body 140 is not rotated by the drive motor 132.

Figure 10:
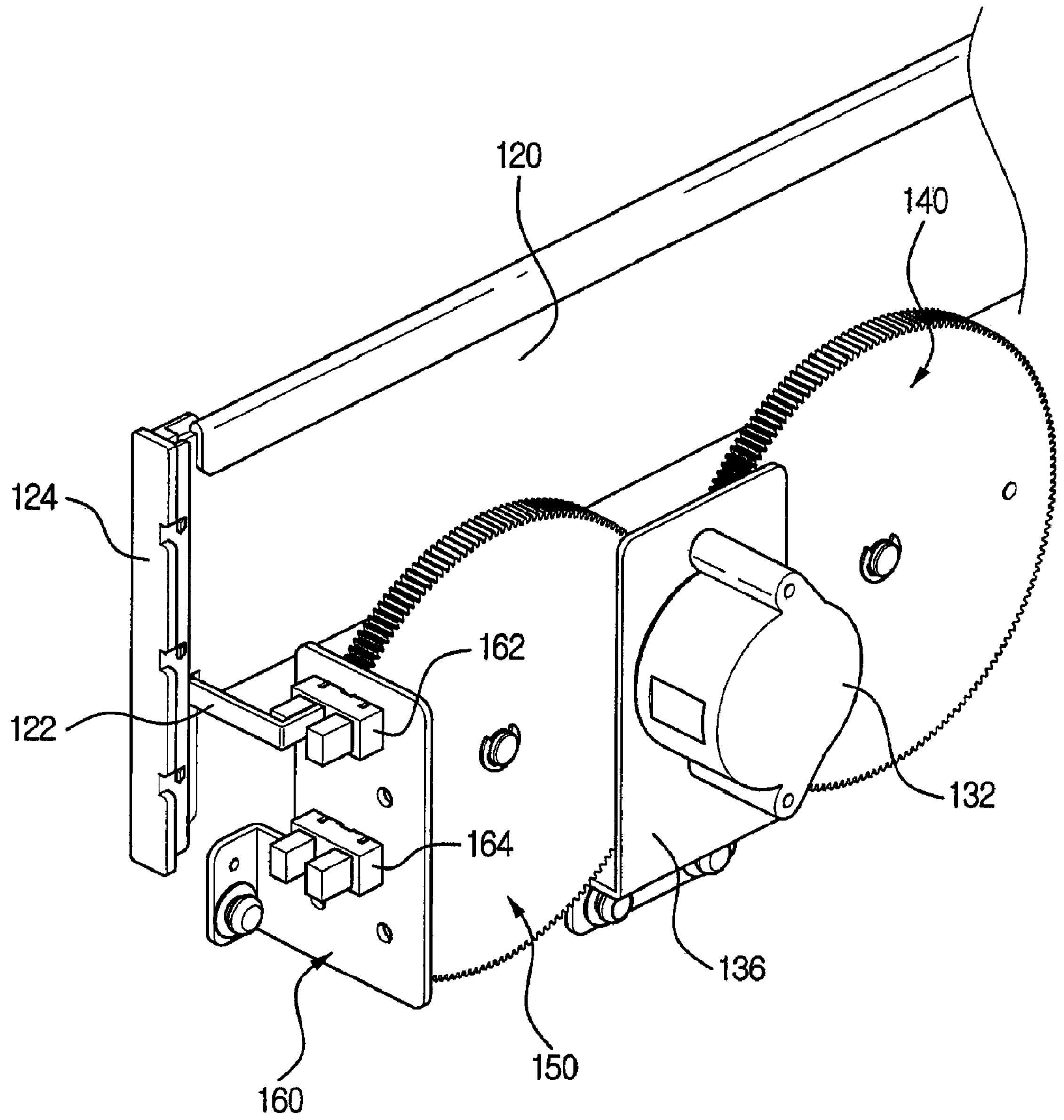
FIG. 10 is a partially expanded perspective view illustrating a sensor unit of the shutter apparatus of FIG. 2.

FIG. 10 is a partially expanded perspective view illustrating the sensor unit of the shutter apparatus of FIG. 2.

Referring to FIG. 10, a part of the shutter is curvedly cut backward to form a sensor bar 122, and a first sensor 162 and a second sensor 164 are installed on a moving path of the sensor bar 122. The sensor unit 160 includes the first and second sensors 162 and 164. The first and second sensors 162 and 164 are optical sensors. The first sensor 162 is installed at the position of the sensor bar 122 when the shutter 120 is closed, and the second sensor 164 is installed at the position of the sensor bar 122 when the shutter 120 is open.

Accordingly, a control unit (not shown) may grasp a state of the shutter 120 according to whether the first sensor 162 and the second sensor 164 sense and may control the rotation of the drive motor 132 according to whether the first sensor 162 is synchronized with the second sensor 164.

The shutter may be easily vertically moved by interaction between the guide rail formed on the cam rotating body and the guide projection of the shutter, and the movement of the shutter may be easily controlled by using the cam having a simple structure.

Also, cam rotating bodies formed in the same shape are disposed at both sides of the shutter, the shutter may be horizontally supported by using each of the guided rails, and the shutter may be vertically moved according to a stable path without distortion.

Also, the guide rail vertically supports the guide projection in a close state and the guide projection and the center of the cam rotating body are located on one straight line, thereby keeping a structural locking state. Particularly, the settling groove is formed on the guide rail in response to the position of the guide projection in the close state, thereby keeping a stable locking state and automatically controlling the accord of the center due to interaction between the guide projection and the settling groove.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A shutter apparatus of a cash transaction machine, comprising:

a drive unit;

a cam rotating body engaged with the drive unit and including a guide rail eccentric to the rotation center thereof; and a shutter including a guide projection moving along the guide rail, which shuttles a straight path in response to the rotation of the cam rotating body;

wherein the rotation center of the cam rotating body and the guide projection are located on one straight line parallel to a moving direction of the shutter and the guide projection is vertically supported by the guide rail in case that the shutter is closed.

2. The apparatus of claim 1, wherein gear teeth are formed on the outer surface of the cam rotating body, and the drive unit includes a drive gear engaged with the gear teeth formed on the outer surface of the cam rotating body.

3. The apparatus of claim 1, wherein a settling groove is formed on the guide rail, toward the rotation center of the cam rotating body, in response to the case in which the shutter is closed.

4. The apparatus of claim 1, further comprising a shutter guide for guiding the shutter to straightly move.

5. A shutter apparatus of a cash transaction machine, comprising:

a drive unit;

a first cam rotating body engaged with the drive unit and including a first guide rail eccentric to the rotation center of the first cam rotating body;

a second cam rotating body, which is opposite to the first cam rotating body, engaged with the drive unit and including a second guide rail eccentric to the rotation center of the second cam rotating body; and a shutter including a first guide projection moving along the first guide rail and a second guide projection moving along the second guide rail, which vertically moves in response to the rotation of the cam rotating body;

wherein the rotation center of the first cam rotating body and the first guide projection are located on one straight line parallel to a moving direction of the shutter, the first guide projection is vertically supported by the first guide rail in case that the shutter is closed, the rotation center of the second cam rotating body and the second guide projection are located on another straight line parallel to the moving direction of the shutter, and the second guide projection is vertically supported by the second guide rail in case that the shutter is closed.

6. The apparatus of claim 5, wherein gear teeth are formed on the outer surface of the first and second cam rotating bodies respectively and the first and second cam rotating bodies are engaged with both sides of a gear of the drive unit and symmetrically operate.

7. The apparatus of claim 5, wherein the first and second guide rails are approximately formed in a circle or an oval shape and symmetrically rotate, the first and second guide projections are located above or below the first and second guide rails and vertically supported by the first and second guide rails, in case that the shutter is closed.

8. The apparatus of claim 7, a first setting groove and a second settling groove are formed on the first and second guide rails respectively, the first and second settling grooves stably support the first and second guide projections respectively, in response to the case in which shutter is closed.

9. The apparatus of claim 7, wherein the first and second cam rotating bodies are continuously rotated in one direction by the drive unit.

10. The apparatus of claim 7, wherein the first and second cam rotating bodies are rotated in the range of certain degrees of an angle, switching the rotating directions thereof, respectively.

* * * * *